Oct. 12, 1954 J. G. NORDAHL 2,691,723

RADIOTELEPHONE COMMUNICATION SYSTEM

Filed Dec. 28, 1951 2 Sheets-Sheet 1

INVENTOR
J. G. NORDAHL
BY B. F. Stoddard
ATTORNEY

Oct. 12, 1954 J. G. NORDAHL 2,691,723

RADIOTELEPHONE COMMUNICATION SYSTEM

Filed Dec. 28, 1951 2 Sheets-Sheet 2

INVENTOR
J. G. NORDAHL
BY B. F. Stoddard
ATTORNEY

Patented Oct. 12, 1954 2,691,723

UNITED STATES PATENT OFFICE 2,691,723

RADIOTELEPHONE COMMUNICATION SYSTEM

John G. Nordahl, Summit, N. J., assignor to Bell Telephone Laboratories, Incorporated, New York, N. Y., a corporation of New York Application December 28, 1951, Serial No. 263,769

4 Claims. (Cl. 250—6)

Figure 1:
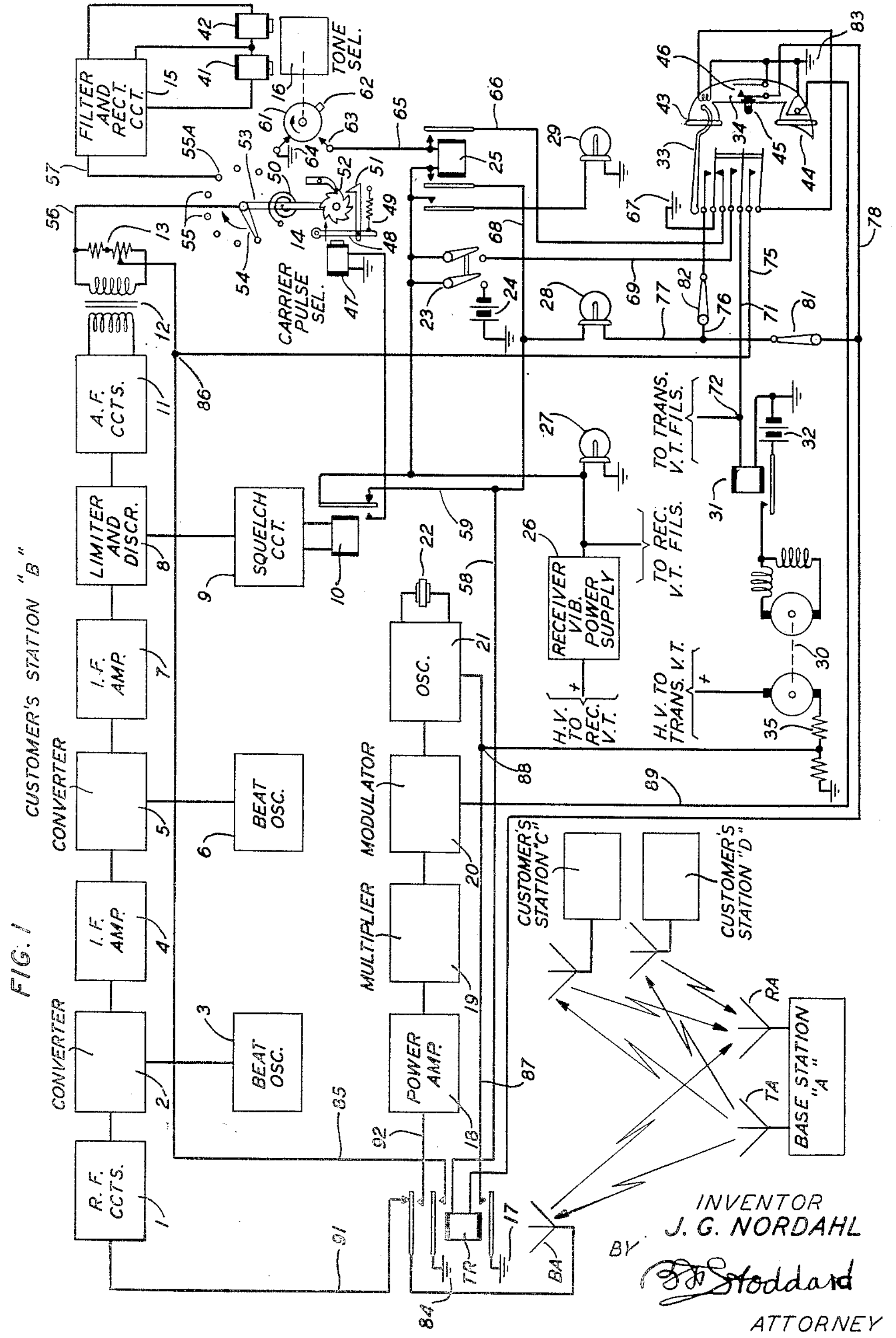

This invention relates to radiant energy signaling systems and, more particularly, to selective calling equipment for use in radio telephone communication systems.

In a single channel two-way radio telephone system having a number of customers' stations, it is desirable to employ lock-out means for preventing a customer from starting his transmitter to initiate a call during periods when another customer is using the common signaling channel. Such lock-out means are, in general, designed to be released at a particular customer's station in response to the transmission from the associated control, or base, station of a selective calling signal assigned to that particular customer's station. Equipments for transmitting selective calling signals are well known in the art, one type being disclosed by C. N. Anderson and H. M. Pruden in an article entitled "Radiotelephone system for harbor and coastal services" and published on pages 245 to 253, inclusive, of the "Proceedings of the Institute of Radio Engineers," volume 27, 1939. Similarly, equipments for receiving and responding to selective calling signals are also well known in the art, one type being disclosed by B. P. Cottrell in an article entitled "Selective calling for mobile telephone services" and published on pages 32 to 34, inclusive, of "FM and Television," issue of January, 1948. When a single channel system is assigned for use by a large number of customers' stations, the selective number capacity of the selective signal receiving equipments must be made correspondingly large. This increases their complexity and also their cost. Since each customer's station must be provided with selective signal receiving equipment, it can be understood that the total cost of this equipment in a system having a large number of customers' stations amounts to a considerable sum.

Accordingly, it is an object of this invention to provide improved means for receiving and responding to selective calling signals in a radiant energy signaling system having a large number of customers' stations.

Another object of the invention is to provide improved means for preventing a customer in a multistation signal channel radio telephone system from initiating the radiation of carrier energy from his station during periods when another customer is employing the channel for communication purposes.

Figure 2:
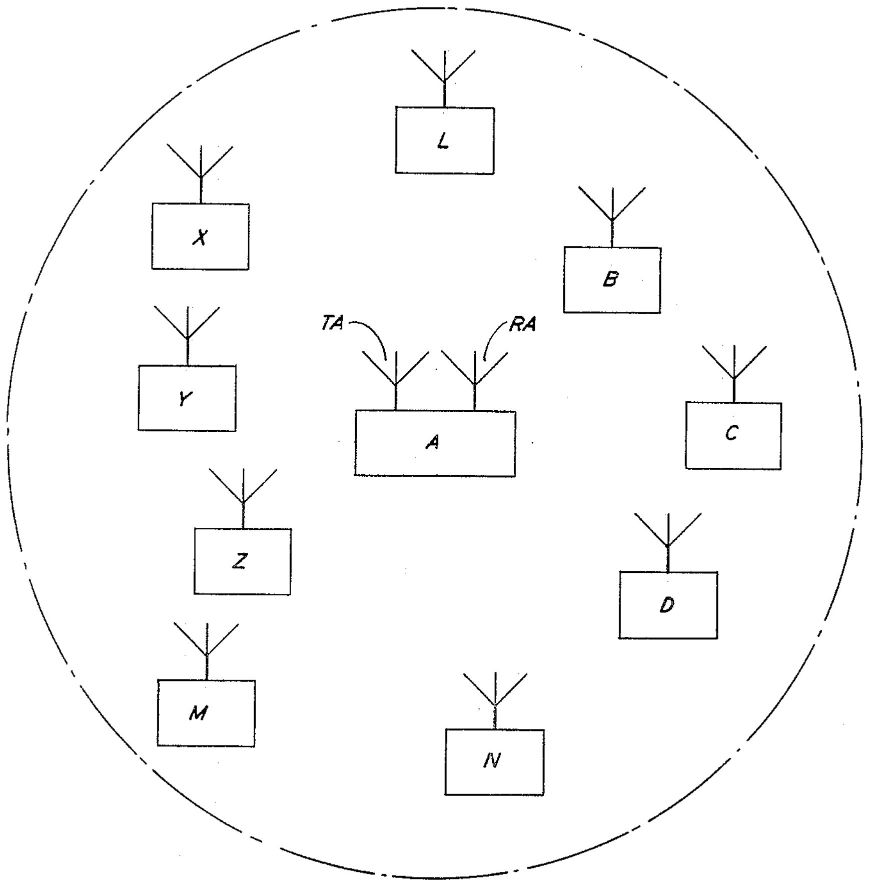

These and other objects of the invention are accomplished in a manner that is fully described hereinafter in connection with the following detailed description of the drawing in which:

Fig. 1 represents a single channel radio telephone system having a control station and a plurality of customers' stations; and Fig. 2 is a schematic diagram of a similar system having a larger number of customers' stations.

The radio communication system shown in Fig. 1 comprises a base, or control station A and three customers' stations B, C, and D. It is to be understood that the system may include more than three customers' stations and that one or more of them may be carried on passenger vehicles. The control station A may be of any suitable type, such as that disclosed by A. C. Peterson in an article entitled "Vehicle radio telephony becomes a bell system practice" and published on pages 137 to 141, inclusive, of the "Bell Laboratories Record," issue of April, 1947. It is equipped with a transmitting antenna TA for radiating carrier current and selective calling signals, and also with a receiving antenna RA for receiving carrier waves transmitted from the customers' stations B, C, and D. It should be noted that during an idle condition of the system, no carrier energy is radiated. It is to be understood that the control station A is further provided with any desired type of selective signal transmitting equipment, such as that disclosed in the above-mentioned article by C. N. Anderson and H. M. Pruden for transmitting two-tone selective calling signals.

As all of the customers' stations may be equipped in a substantially similar manner, only the equipment at station B is shown in detail. Carrier energy from the base station A is received at the customer's station B by a transmitting and receiving antenna BA. Since it may be assumed that this system is of the simplex type wherein frequency modulated carrier waves having an assigned mean frequency are used for transmission from the base station A to the customers' stations B, C, and D, and alternatively for transmission from each of the customers' stations B, C, and D to the base station A, the station B is provided with a single transmitting-receiving antenna BA. Carrier energy received by the antenna BA travels over the released outer top armature of a conventional transmit-receive relay TR to any suitable type of frequency modulation receiving circuit, such as that disclosed in Patent 2,527,617, issued October 31, 1950, to U. S. Berger. This receiving circuit includes radio frequency input circuits 1, a first converter 2 having a first beating oscillator 3 coupled thereto, a first intermediate frequency amplifier 4, a second converter 5 having a second beating oscillator 6 coupled thereto, a second intermediate frequency amplifier 7, a limiter circuit 8 having a squelch control circuit 9 and a squelch relay 10 coupled thereto, and an audio output circuit 11 which is coupled through a transformer 12 and a potentiometer 13 to a carrier pulse selector 14. Associated with the carrier pulse selector 14 is a filter and rectifier circuit 15 which is coupled to the two coils 41—42 of a tone selector 16 which is of the type disclosed in the above-mentioned article by B. P. Cottrell.

When the transmit-receive relay TR is energized by means described hereinafter, it operates its armatures to open the above-mentioned receiving circuit. A conventional transmitting circuit is now closed extending from the antenna BA over the operated outer top armature of relay TR, through a power amplifier 18, a frequency multiplier 19, a modulator 20, and then to an oscillator 21 which has its frequency controlled by a quartz control 22. The operation of the bottom armature of relay TR connects ground 17 to the transmitting oscillator 21 to effect the removal of a blocking bias in a manner well known in the art.

The station B is further provided with a manually operable on-off switch 23 for controlling the application of power from a battery 24. Normally, the switch 23 is kept closed unless the customer wishes for some reason to disable his receiving circuit. When the switch 23 is closed, current from battery 24 is supplied to the heating filaments of the vacuum tubes in the receiving circuit and also to a conventional vibrator power unit 26 which in turn supplies high voltage to the anodes of the vacuum tubes in the receiving circuit. Current from battery 24 also effects the lighting of a lamp 27 thereby providing a visible indication that the power has been turned on. Although the closure of switch 23 closes a portion of a circuit leading to the filaments of the vacuum tubes in the transmitting equipment and also to the winding of a control relay 31, which controls the application of current from battery 32 to a dynamotor 30, this circuit is not completed at this time.

In addition to the above mentioned equipment, the station B also includes a talk lamp 28, a call lamp 29, a lockup relay 25, a telephone instrument 34, a holder 33 for holding the telephone instrument 34 during idle periods, and other equipment that is described hereinafter. The telephone instrument 34 is shown in the form of a handset having a telephone receiver 43 and a telephone transmitter 44, but any other type of telephone instrument may be used if desired. The handset 34 is provided with a conventional push-to-talk button 45 for controlling the engagement of a set of spring contacts 46 which are normally open. Although the holder 33 is shown in the form of a hook switch, any other suitable type of contact-operating holder may be used if desired.

The squelch circuit mentioned above may be of the type disclosed in the above-identified Berger patent which is controlled by the grid currents in the limiter 8 and is therefore a carrier-operated device. Another type of carrier-operated squelch circuit which may be used if desired is that disclosed on page 653 of F. E. Terman's "Radio Engineers' Handbook." If desired, it may be a noise-responsive type or a signal-to-noise ratio type squelch circuit controlled respectively through vacuum tubes and rectifiers to operate in response to a reduction in noise or to a ratio of noise to carrier levels. It may be any suitable type which will respond to the reception of carrier energy by producing a voltage change or current change at a point in its circuit which will effect the energization of the squelch relay 10. Upon being energized after the on-off switch 23 has been closed, the squelch relay 10 operates its armature to connect battery 24 to the winding of a stepping magnet 47. This energizes the stepping magnet 47 and causes it to operate its armature 48 which is normally held in its unoperated position by any suitable biasing means, such as spring 49. One end of the armature 48 is provided with a pawl 51 adapted to engage a ratchet 52 which is mounted upon a shaft 53. Also mounted upon the shaft 53 is a switch-arm 54 having a plurality of contacts 55 associated therewith. The switch-arm 54 is connected by a conductor 56 to the secondary winding of the audio output transformer 12 and is provided with a restoring spring 59 for returning it to its initial position when the selector 14 is released as is described hereinafter. It is to be noted that only one of the contacts 55, namely contact 55A, is connected by a conductor 57 to the input of the filter and rectifier circuit 15.

When the armature 48 is operated by the stepping magnet 47, it actuates the pawl 51 and causes it to rotate the ratchet 52 one step thereby similarly rotating the switch-arm 54 one step and moving it from one of its contacts 55 to the next. The magnet 47 is of the slow-to-release type so that its armature 48 will remain in its operated position in response to the reception of steady carrier current and will not return to its released position until a suitable interval of time after the cessation of received carrier current. After a certain number of carrier pulses have been received, the switch-arm 54 will have been stepped around to engage its contact 55A. This closes a path from the secondary winding of the audio output transformer 12, along conductor 56, over the switch-arm 54 to contact 55A, and then along conductor 57 to the input of the filter and rectifier circuit 15. Thus, the selectors 14 and 16 may be considered to be connected in tandem. Two-tone selective calling signals may now be transmitted from the base station A and, after being received at station B, will pass over the circuit just described to effect the energization of the coils 41—41 of the tone selector 16.

Thus, when the operator at the control station A wishes to call the customer at station B, the operator causes carrier current to be radiated from her transmitting antenna TA. This is received at station B and effects the energization of the squelch relay 10 which operates the carrier pulse selector 14 to move the switch-arm 54 one step as was described above. The operator at station A now interrupts the carrier current a definite number of times to produce an assigned number of carrier pulses, this number being the number of steps required to move the switch-arm 54 to its contact 55A. When this initial station-selecting operation has been completed, the operator at station A ceases to interrupt her carrier and allows it to remain steady. As was described above, this holds the stepping magnet 47 energized so that the switch-arm 54 will remain on its contact 55A. With the squelch relay thus held operated, the energizing circuit of the transmit-receive relay TR, which extends along conductors 58 and 59, is open at the relay contact at the end of conductor 59. Consequently, the customer at station B cannot now energize his transmit-receive relay TR to connect his transmitting circuit to the antenna BA. It is to be understood that each of the other customers' stations C and D have a different one of the contacts 55 connected to their respective filter and rectifier circuits so that a different number of carrier pulses are required to connect their audio output circuits to the input of their respective tone selectors.

The operator at the base station A now causes an assigned combination of two-tone selective calling signals to be radiated from her transmitting antenna TA in the manner described in the above-mentioned article by C. N. Anderson and H. M. Pruden. Upon being received at station B, these signals are applied to the coils 41—42 for causing the tone selector 16 to rotate its code wheel 61. As this particular combination of tone signals is the combination assigned to station B, the code wheel 61 will move its contact pin 62 into engagement with a contact 63. It is to be understood that each of the other stations C and D require the transmission of a different tone signal to effect the engagement of their respective contact pins with their associated contacts. This closes a path from ground 64, over the code wheel 61 and contact pin 62 to the contact 63, along conductor 65, through the winding of the lockup relay 25, and then over the on-off switch 23 to battery 24. Relay 25 now becomes energized and operates its armatures, the operation of the right armature closing a locking circuit for relay 25 extending along conductor 66 and over the top spring contact of the hook switch 33 to ground 67. The operation of the outer left armature of relay 25 closes an obvious circuit for current from battery 24 to effect the lighting of the call lamp 29 thereby providing the customer with a visible indication that his station B has been called. The operation of the inner left armature of relay 25 connects battery 24 along conductor 68 and 58 to the winding of the transmit-receive relay TR to prepare it for subsequent energization when the push-to-talk button 45 is operated as is described hereinafter.

If the customer at station B does not answer the call for some reason, such as being absent from his station B, the operator at station A abandons the call by transmitting an assigned tone pulse which acts as a clearing-out signal in the manner described in the above-mentioned article by B. P. Cottrell to effect the release of the tone selector 16 which thereupon restores its code wheel 61 to its initial position. Finally, the operator discontinues the radiation of carrier energy from her transmitting antenna TA. This effects the deenergization of the squelch relay 10 which releases its armature to effect the deenergization of the pulse selector relay 47. This permits the springs 49 and 50 to restore the carrier pulse selector 14 to its initial condition. Due to relay 25 being locked up, the call lamp 29 will remain lighted so that, when the customer returns to his station B, it will serve to inform him that his station was called during his absence. He should then call the operator at the control station A as is described hereinafter.

If the customer is present at station B when the call is initiated from the control station A and wishes to answer the call, he does so by removing the telephone instrument 34 from its holder 33. This releases the springs of the hook switch 33 which now move upward to engage their upper contacts. The upward movement of the top hook switch spring opens the locking circuit of relay 25. However, relay 25 does not release its armatures at this time as its alternate energizing circuit through the contact pin 62 on the code wheel 61 still remains closed. The engagement of the middle hook switch spring with its contact closes a circuit extending from battery 24 along conductor 69, over the middle hook switch spring, and then along conductor 71 to the junction point 72. This applies current from battery 24 to the filaments of the vacuum tubes in the transmitting circuit and also to the winding of the control relay 31. Relay 31 now operates its armature to connect battery 32 to the dynamotor 30 thereby starting the dynamotor 30 and causing it to apply high voltage to the vacuum tubes in the transmitting circuit. Voltage from the dynamotor 30 is also applied through the resistor 35 to the junction point 88 and then to the oscillator 21. The engagement of the bottom hook switch spring with its contact connects the telephone receiver 43 along conductor 75 to the junction point 86 and then through the potentiometer 13 to the secondary winding of the audio output transformer 12. The engagement of the top hook switch spring with its top contact connects ground 67 to this top contact for performing different functions.

For example, if a switch 82 is closed and another switch 81 is open, then this top contact is connected by a conductor 76 to conductor 77 leading to the talk lamp 28. This causes the talk lamp 28 to light thereby providing the customer at station B with a visible indication that his station equipment is now in the proper condition for him to speak into his telephone transmitter 44 and for this speech to be radiated by his transmitter BA to the control station A. If both of the switches 81 and 82 are closed, the carrier current from station B will be radiated in a manner described hereinafter for duplex operation of the system. Alternatively, if the switch 82 is open and the switch 81 is closed, then the talk lamp 28 will be lighted only when the transmit-receive relay TR is energized and will thereby indicate when the customer's transmitting equipment is operating.

Under the conditions described above, the customer at station B has been signaled and has picked up his telephone instrument 34 to answer the call. He now pushes his push-to-talk button 45 thereby closing the non-locking contacts 46. This connects ground 83 through the contacts 46, along conductor 78, through the winding of the transmit-receive relay TR, along conductors 58 and 68, over the operated inner left armature of relay 25, and then over the closed on-off switch 23 to battery 24. This energizes the transmit-receive relay TR which operates its armatures. The operation of the outer top armature of relay TR disconnects the antenna BA from conductor 91 leading to the receiving circuit and connects it instead to conductor 92 leading to the transmitting circuit. The operation of the inner top armature of relay TR applies ground 84 along conductor 85 to the junction point 86 thereby short-circuiting the telephone receiver 43 so that transmitter noise will not be heard. The operation of the bottom armature of relay TR applies ground 17 along conductor 87 to the junction point 88. This short-circuits a portion of the resistor 35 thus removing the bias voltage applied to the transmitting oscillator 21 which thereupon proceeds to generate its carrier energy. The customer at station B may now speak into his telephone transmitter 44 and, since the transmitter 44 is connected by a conductor 89 to the modulator 20, the customer's speech will modulate carrier waves generated by the oscillator 21 and this modulated carrier energy will now be radiated by the antenna BA to the control station A. By alternatively pressing the push-to-talk button 45 on his handset 34 when he wishes to talk, and by releasing the button 45 when he wishes to listen, the customer at station B can communicate with the operator at the base station A on a two-way basis.

It is to be noted that a feature of the above-described circuit is that, with the switch 81 closed and the switch 82 open, the talk lamp 28 will be lighted only during periods when the push-to-talk button 45 is operated. As the armatures of the transmit-receive relay TR are operated only during these same periods, the lighting of the talk lamp 28 thus serves as an indication that the customer's transmitting circuit is in operation. This is a desirable feature because, as is explained hereinafter, under some conditions the customer's transmitting circuit may be locked out of operation and, if it were not for the extinguishing of the talk lamp 28 at this time, the customer at station B would not be aware of the lock-out condition and would be speaking into his telephone transmitter 44 under the false impression that his speech was being transmitted to the base station A.

The above-mentioned lock-out condition might arise when, due to an emergency, the operator at the control station A wishes to place immediately a call to another customer even though the contact pin 62 of the tone selector at station B is now in engagement with its contact 63 and the transmitting circuit is activated. The operator at station A accomplishes this lock-out effect by impressing a clearing-out tone signal upon her carrier. When this signal is received at station B, it holds the squelch relay 10 energized and causes the code wheel 61 to return to its initial position thereby disengaging the contact pin 62 from its contact 63. This opens the circuit from the winding of the lockup relay 25 along conductor 65 to ground 64 thereby effecting the release of its armatures since its alternate circuit to ground 67 is now open due to the upward movement of the top hook switch spring. Release of the outer left armature of relay 25 extinguishes the call lamp 29 and the release of its inner left armature opens the energizing circuits of both the talk lamp 28 and the transmit-receive relay TR. Relay TR now releases its armatures with its bottom armature removing ground 17 from conductor 87 leading to the transmitting oscillator 21, and its outer top armature disconnecting the antenna BA from the transmitting circuit. Consequently, the customer at station B cannot now radiate his carrier and is therefore effectively locked out of the system from the standpoint of transmitting signals from his station B. As was stated above, the existence of this lock-out condition is indicated to him by the extinguishing of the talk lamp 28.

Assuming that communication between stations A and B is not interrupted by a lock out, the call proceeds on a normal two-way basis. When this call is terminated, the customer at station B replaces his telephone instrument 34 upon its holder 33 thereby forcing the hook switch springs downward. This movement of the lower spring opens the path from the telephone receiver 43 to the audio output circuit. Similar movement of the middle spring opens the energizing circuit of the control relay 31 which releases its armature to stop the dynamotor 30. The downward movement of the top spring opens the path from ground 67 to the switch 82. At the same time, the operator at station A transmits the clearing-out tone signal to effect the restoration of the tone selector 16 to its normal condition. The operator then discontinues the transmission of carrier energy from her transmitting antenna TA thereby causing the carrier pulse selector 14 to return to its initial position. Thus, the transmitting and receiving equipment at station B is restored to its normal idle condition.

If the customer at station B had been absent when the call from station A was first made and the operator at station A had then abandoned the call, the call lamp 29 would have remained lighted as was described above. Upon returning to his station B and noticing that the call lamp 29 is lit, the customer proceeds to call the operator at the base station A. He does this by removing his telephone handset 34 from the hook switch 33 which permits the hook switch springs to move upward as was stated above. The upward movement of the top spring removes ground 67 from the locking circuit of relay 25 which thereupon releases its armatures, the release of its outer left armature extinguishing the call lamp 29. If the radiant energy signaling channel is busy with another call at this time, then the squelch relay 10 will be energized and its armature will be operated. Consequently, the circuit from battery 24 along conductors 59 and 58 to the winding of relay TR will now be open. As the alternative path for energizing relay TR which extends along conductor 68 is now open at the released inner left armature of relay 25, the customer cannot now connect his antenna BA to his transmitting circuit. The customer at station B is thus locked out of transmitting his carrier and therefore cannot cause interference to the call now in progress.

If the radiant energy signaling channel is idle when the customer at station B calls back, then the squelch relay 10 will not be energized and its armature will be released. Assuming that the switch 82 is closed and the switch 81 is open, then, when the customer removes his telephone instrument 34 from its holder 33, a circuit will be closed from ground 67, over the top hook switch spring, over switch 82, along conductors 76 and 77, through the talk lamp 28, along conductor 59, over the released armature of relay 10, and then over the operated on-off switch 23 to battery 24. This causes lamp 28 to light thereby providing the customer with a visible indication that the channel is idle. From this standpoint, the lamp 28 may be considered as functioning as a channel-available indicator. Accordingly, when the customer now pushes his push-to-talk button 45 to close the contacts 46, a path for energizing the transmit-receive relay TR will be closed extending from battery 24, over the on-off switch 23, over the released armature of relay 10, along conductors 59 and 58, through the winding of relay TR, along conductor 78, and then through the closed contacts 46 to ground 83. This starts the operation of the transmitting equipment as was described above and causes carrier energy to be radiated from the antenna BA. The customer now proceeds to speak into his telephone transmitter 44 and states his call number. If the switch 81 is closed and the switch 82 is open, the talk lamp 28 will light whenever the push-to-talk button 45 is operated.

When the call number from station B is received by the receiving antenna RA at control station A, the operator causes her carrier to be radiated by her transmitting antenna TA. The operator next transmits the particular carrier pulse selecting signal and selective calling tone signal which are assigned to the station B. These signals effect the operation of the carrier pulse selector 14 and the tone selector 16 at station B in the manner described above thereby energizing the lockup relay 25 which performs the functions mentioned above. At the same time, the transmission of this carrier energy effects the energization of the squelch relay at the other customers' stations in the system and this, in turn, locks out these stations and prevents them from interfering with the call. The call now proceeds as described above. It is to be understood that the invention is not limited to a two-tone selector as a one-tone, three-tone, or any other suitable type of tone selector may be used if desired.

This selective calling system is flexible and possesses a large selective number capacity. Thus, stations C and D could be assigned the same carrier pulse selective signal but different tone selective signals. A large number of combinations of these two types of selective calling signals are possible.

For example, in a system having a larger number of customers' stations, such as the system shown in Fig. 2 the customers' stations may be divided into a plurality of groups. A particular number of carrier pulses may then be assigned solely to each customer's station in only one of the groups with a particular tone selective calling signal being assigned jointly to only one customer's station in each of the groups. Thus, in Fig. 2, stations B, C, and D may constitute one group, stations L, M, and N a second group, stations X, Y, and Z a third group. Then three carrier pulses could be required to operate the carrier pulse selector in each of stations B, C, and D; four pulses could be assigned to operate the pulse selector at each of stations L, M, and N; and five pulses could be designated for operating the pulse selector at each of stations X, Y, and Z. A particular tone selective signal could then be assigned to operate the tone selector at each of stations B, L, and X; a different tone signal being assigned to each of stations C, M, and Y for operating their tone selectors; and a third tone signal being assigned to operate the tone selectors at each of stations D, N, and Z. Consequently, by employing only three different carrier pulse selective signals and only three different tone slective signals, it is possible to operate the tandem selectors and to light the call lamp at any one of the nine customers' stations. Therefore, this selective calling method may be applied to a system comprising hundreds of customers' stations.

The invention is not limited to use in a single channel system as it may be employed with advantage in multichannel radiant energy signaling systems. It is also not limited to systems operating on a simplex basis but may be used in full duplex or half-duplex systems. In fact, the equipment at the customer's station B shown in Fig. 1 may be readily converted for operation on a full duplex basis. This can be accomplished by omitting the two top armatures of the transmit-receive relay TR and by connecting the receiver lead 91 and the transmitter lead 92 to the antenna BA through suitable filter networks. The push-to-talk button 45 should also be omitted and the contacts 46 should be permanently closed. In addition, both of the switches 81 and 82 should be closed as was stated above. The operation of the station is substantially the same as described above except that, when the customer now answers a call, his transmitting circuit is energized when he removes the handset 34 from the hook switch 33. The talk lamp 28 will now light when relay TR is energized. However, if desired, the lamp 28 may be connected directly to ground instead of to the switches 81 and 82 for causing it to function as a service-available indicator in the manner described above.

This particular embodiment of the invention has been described in order to explain the principles and features of operation of the invention. It is to be understood that the invention is not limited to the specific circuit construction shown in the drawing as various modifications may be made without exceeding the scope of the invention which is to be limited only by the claims appended hereto.

What is claimed is:

1. A radiant energy signaling system comprising in combination a first signaling station having radiating means for radiating pulses of carrier current and tone selective calling signals, a second signaling station having receiving means for receiving said carrier pulses and tone signals, said second signaling station also having a transmitting circuit for producing and radiating carrier energy, a control circuit for alternatively activating and deactivating said transmitting circuit, a tone selective signal receiving device for normally disabling said control circuit, said device being adapted to enable said control circuit in response to the application to said device of an assigned tone selective calling signal, said device being normally disabled, and a carrier pulse selector responsive to the reception of an assigned number of carrier pulses for enabling said tone selective signal receiving device, said tone selective signal receiving device being enabled by said carrier pulse selector only after the entire assigned number of carrier pulses have been received.

2. A radiant energy signaling system comprising in combination a first signaling station having radiating means for radiating pulses of carrier current and tone selective calling signals, a second signaling station having receiving means for receiving said carrier pulses and tone signals, said second station also having call indicating equipment, operating means for operating said equipment, said operating means being responsive to the reception by said receiving means of an assigned tone selective calling signal, and conditioning means for limiting the response of said operating means to only those assigned tone signals which have been preceded by an assigned number of carrier pulses.

3. A radiant energy signaling system comprising in combination a first signaling station having radiating means for radiating pulses of carrier current and tone selective calling signals, a second signaling station having a receiving circuit for receiving said carrier pulses and tone signals, normally deactivated call receiving equipment at said second station, a tone selector at said second station for activating said call receiving equipment in response to the application to said selector of an assigned tone selective calling signal, said tone selector being normally uncoupled from said receiving circuit, and a pulse selector coupled to said receiving circuit for coupling said tone selector to said receiving circuit, said pulse selector being responsive to the reception by said receiving circuit of an assigned number of said carrier pulses.

4. A radiant energy communication system having radiating means for radiating both carrier current and selective calling signals, said system comprising a plurality of groups of radiant energy communication stations, each of the stations in each of said groups of stations having a call indicator, a first normally open circuit for energizing said indicator, an electroresponsive instrumentality for closing said first circuit, a second normally open circuit for energizing said instrumentality, a first device responsive to the radiation of a preassigned selective calling signal for closing said second circuit, a third normally open circuit for operating said first device, and a second device responsive to the radiation of a preassigned number of pulses of carrier current for closing said third circuit, said preassigned selective calling signal being assigned jointly to only one station in each of said groups of stations, and said preassigned number of carrier pulses being assigned solely to only one group of said groups of stations.

References Cited in the file of this patent

UNITED STATES PATENTS

| Number | Name | Date |
|---|---|---|
| 1,464,565 | Espenschied | Aug. 14, 1923 |
| 1,814,524 | Nelson | July 14, 1931 |
| 2,413,296 | Deal et al. | Dec. 31, 1946 |
| 2,503,727 | Grondahl et al. | Apr. 11, 1950 |
| 2,530,815 | Dimmer | Nov. 21, 1950 |
| 2,599,097 | Entz et al. | June 3, 1952 |